United States Patent [19]

Kardashian

[11] 3,745,553
[45] July 10, 1973

[54] SINGLE SOURCE SEVERAL SENSOR SECURITY SYSTEM

[75] Inventor: Vahram S. Kardashian, Plymouth Village, Minn.

[73] Assignee: Honeywell Inc., Minneapolis, Minn.

[22] Filed: Dec. 6, 1971

[21] Appl. No.: 205,085

[52] U.S. Cl............. 340/276, 340/171 PP, 340/412
[51] Int. Cl...................... G08b 13/24, G08b 25/00
[58] Field of Search.................. 340/276, 274, 408, 340/409, 213.1, 171 PP, 171 A, 412, 413, 223, 171, 258 R; 324/43; 331/55, 172

[56] References Cited
UNITED STATES PATENTS

| | | | |
|---|---|---|---|
| 3,550,090 | 12/1970 | Baker | 340/408 X |
| 3,472,965 | 10/1969 | Blossom | 340/171 |
| 3,400,328 | 9/1968 | Penn | 324/43 |
| 3,402,404 | 9/1968 | Burley | 340/413 X |
| 3,201,757 | 8/1965 | Himmel | 340/171 |
| 3,120,758 | 2/1964 | Craddock | 340/413 |
| 3,399,381 | 8/1968 | Jackson | 340/171 PP |
| 3,562,638 | 2/1971 | Renard | 324/43 |

*Primary Examiner*—John W. Caldwell
*Assistant Examiner*—Scott F. Partridge
*Attorney*—Lamont B. Koontz and Omund R. Dahle

[57] ABSTRACT

A single source several sensor security system in which a plurality of magnetometer sensors report back through a common circuit to a processor which will process the outputs of the several units. The magnetometer sensors are designed to be frequency selective so that each sensor responds to an individual frequency of drive excitation.

7 Claims, 3 Drawing Figures

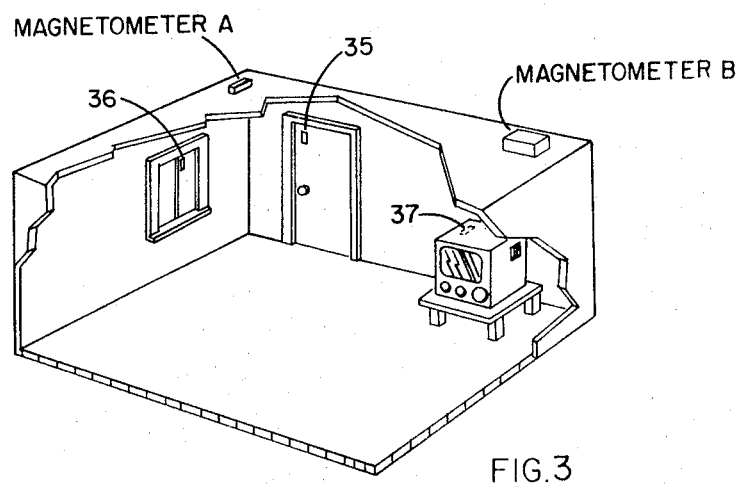
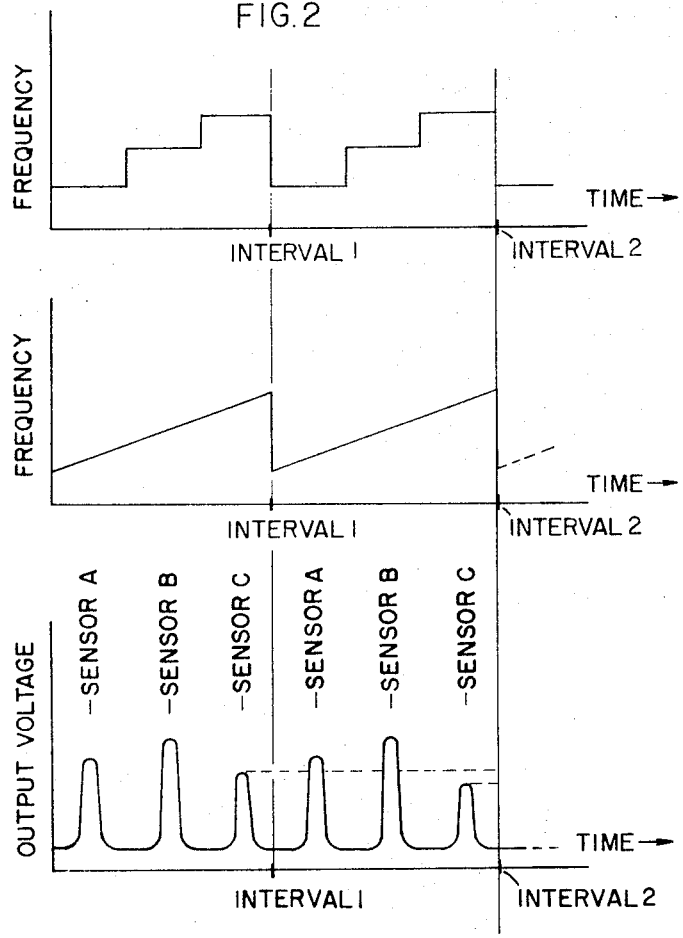

SINGLE SOURCE SEVERAL SENSOR SECURITY SYSTEM

BACKGROUND AND SUMMARY OF THE INVENTION

An anisotropic thin film plated wire magnetometer is disclosed in my co-pending application, Ser. No. 45,466, filed June 11, 1970, now U.S. Pat. No. 3,657,641, and entitled "Plated Wire Magnetometer." Magnetometers of this type or other types are useful in the security field where it is desired to detect intruders and to protect property from being stolen and the like.

The present invention is based on the positioning of small permanent magnets in or on objects to be protected, such as doors, windows, drawers, paintings and furniture and monitoring the protected objects via magnetic sensors, i.e., the magnetometer, placed at some distance from the secured object. A signal triggering mechanism is actuated by movement of the object (with magnet) which is displaced by the intruder. The displacement of the permanent magnets disturbs the ambient field at the location of the magnetic sensor. The field disturbance is sensed and amplified and the condition then communicated to a signal processor. The anisotropic permalloy material of the magnetometer has been disclosed in the form of a plated wire but anisotropic films such as vacuum deposited flat film or electrodeposited flat film may also be used as transducers.

The invention is aimed at reducing the general installation cost of the intrusion detection system by allowing the protected structure to be a few feet distant from the hard wiring to the sensor. The magnetic signals which reflect an intrusion can be generated without installation of electric wiring to the object being protected. Thus, the wiring can be concealed in the attic, basement, underground or other unobtrusive location. The range is not attenuated by signal passage through non-magnetic walls, floors, ceilings and the like. Since magnets distributed throughout an area will be located at different distances from the sensor, it is not necessary that they all be of equal strength. The range of detection determines the magnetic strength of the magnet which is required.

Immediately upon arming the system, the system can monitor the state of each door, etc., and display on a panel in the processor a state of alarm or insufficient security if an access point has been left open. This function is herein referred to as supervision.

The magnetic sensing unit comprises a plated wire magnetometer. A plurality of sensing units at different locations in the protected area are used in the system. A narrow band pass filter in each sensing unit allows each sensing unit only one frequency of drive excitation. The band pass filter may be a simple LC series resonant or parallel resonant circuit as disclosed or may be a more elaborate filter. As the multifrequency oscillator driver operates at the frequency to which a sensing unit is tuned, that sensing unit responds and provides an output signal to the processor indicating the condition in the area of that sensing unit. Upon the movement of a magnet in the area of that sensor, the output signal amplitude changes and is measured at the processor. The measuring logic will process the outputs of a plurality of units. In order to identify the alarm source, the frequency of the oscillator driver is correlated with the output signal as described in detail below.

BRIEF DESCRIPTION OF THE DRAWING

FIG. 2 discloses various operating characteristics of the system disclosed in FIG. 1.

FIG. 3 discloses diagrammatically how my invention can be applied in a residence.

DESCRIPTION

Figure 1:
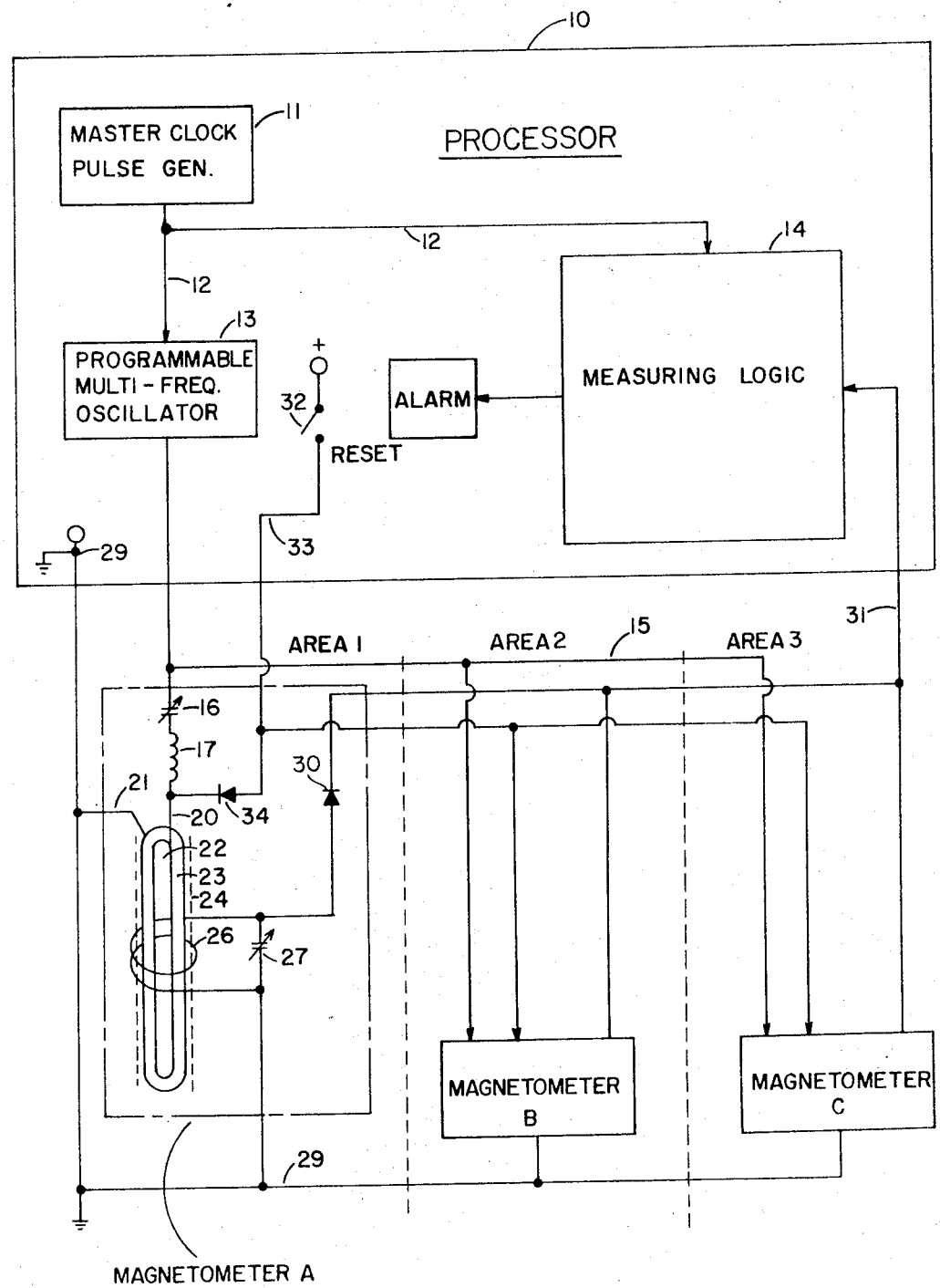
FIG. 1 is a block diagram and partial schematic of the security system of my invention.

The overall system comprises a multifrequency oscillator driver, signal processing means and several magnetic sensing units. Each of the magnetic sensing units is tuned to a specific different frequency and responds only when the oscillator driver is operated at the frequency of that sensing unit. The oscillator driver is a variable frequency generator. The frequencies can be varied in a step function, in a ramp or sweep form, or some other convenient manner.

Referring specifically now to FIG. 1, the figure discloses a processor 10 energized from a suitable source of electrical power, not shown. The processor comprises a master clock pulse generator 11 which provides synchronizing pulses on line 12 to a programmable multifrequency oscillator driver 13 and also to signal measuring logic 14. FIG. 2A shows a step output of frequency versus time in which the frequency output of the oscillator changes to three different frequencies during each period. As an example, frequencies of 300 kHz, 350 kHz and 400 kHz have been used in the step frequency oscillator. FIG. 2B shows a sweep frequency output covering essentially the same frequency spread as shown in FIG. 2A.

An output conductor 15 from oscillator 13 of FIG. 1 is directed to the inputs of magnetometers A, B, and C. Specifically in magnetometer A, which is shown in schematic form, the conductor 15 is connected by means of a series tuned circuit comprising a variable capacitor 16 and an inductance 17 to the plated wire drive coil 23 at terminal 20, the other terminal 21 of the plated wire coil 23 being grounded. The combined inductance of the plated wire coil and the coil 17 together with the circuit capacity comprising capacitor 16 forms a resonant circuit and is tuned by capacitor 16 to be resonant at one of the frequencies generated by oscillator 13, as for example 300 kHz.

The plated wire drive coil or winding 23 has a thin rectangular form 22 around which is wound a plurality of turns of the plated wire. The plated wire coil 23 is enclosed by an electrostatic shield 24 in order to reduce the capacitive coupling between the plated wire drive coil 23 and the pick-up coil 26. The pick-up coil or winding 26 is preferably many turns of ordinary wire wound around the plated wire coil. The variable capacitor 27 connected in parallel with pick-up winding 26 provides a parallel tuned circuit which is tuned to be resonant at the same frequency as the series LC circuit mentioned above. One terminal of the pick-up coil 26 is grounded and the other is connected through rectifying means 30, here shown as a diode, the rectified output pulses then being transmitted on a line 31 to the measuring logic 14 in the processor 10.

A reset switch 32 in the processor is connected to apply a positive potential on line 33 and through a diode 34 in each magnetometer to reset the plated wire 23 of each magnetometer by remagnetizing all magnetic films to a saturated state. Thus, from the processor low voltage electric wiring (conductors 15, 33, 31 and 29) leads to a plurality of sensors which are at suitable intervals located over or under doors and windows and the like which are to be secured. Power requirements of the sensors are very low. All sensors, which are energized sequentially, are energized once every period. The period duration may be in the order of one second.

The system has been disclosed with three magnetic sensing units operating at three different frequencies, however, the system is not limited to three sensing units and the multifrequency oscillator is not limited to three frequencies. The system may include as many sensing units each tuned to its individual frequency and the oscillator may generate as many frequencies as is needed to adequately serve the protected area.

In operation, the magnetic sensors, i.e., magnetometers A, B, and C are emplaced near their respective magnets which magnets are attached or embedded in doors, windows and protected objects. FIG. 3 shows a room having a magnetometer A placed in the attic space above a door and a window to be monitored and magnetometer B is similarly placed in the proximity of furniture to be monitored, here shown as a television set. The door has a magnet 35 attached to it or embedded into it. Likewise the window has a magnet 36 and the television set has a magnet 37 attached to it. The sensors A and B are wired to one another by a four-conductor unshielded cable, the cable terminating at the processor 10. Other sensors in addition to sensors A and B can be installed to protect different wings or different levels of the building or residence. One sensor can monitor more than one access or object at a time if the sensor is within the detection range of each such object. The effective detection range between sensor and magnet can be increased by use of high permeability magnetic flux gatherers linking or directing field lines of the magnet to the sensor.

Each sensor monitors the DC field of its nearby magnet. Movement of the magnet relative to the sensor which may be achieved, for instance, by means of opening a door, causes the DC field at the sensor to change. The change in the field generates a signal which is transmitted to the processor for processing. Rotating the magnet or increasing its distance from the sensor is the means of affecting the direction in intensity of the vector magnetic field at the location of the sensor.

Each magnetometer sensor is made to respond to a narrow band excitation frequency which is different from the excitation frequencies of the remaining sensors in the set. Hence, the output of each sensor represents the signature of the door or window which it monitors. This technique characterizes the opening which is subjected to intrusion. Also, the information content which is transmitted is free from the electronic disturbance of the other sensor outputs and associated noise. If a general area is to be identified rather than a specific object, it may be desirable to have more than one sensor operating at a given frequency. Thus, magnetometer means A might include several magnetometers located in the general area.

The output of each sensor is rectified by diode 30 and transmitted to the signal measuring means of the processor. In many applications, it is desirable that the processor recognize the reporting station. For such applications, a display panel of lights or drops in the processor can indicate the reporting station. The signal measuring logic 14 is therefore synchronized to the programmable multifrequency oscillator 13 so that as each of the plurality of reporting stations submits its DC reply pulse, the originator of the reply pulse and therefore the location is known. Each of the magnetic sensing units provides an output in sequence as it is activated by the correct frequency, and each output is rectified and transmitted as a DC pulse to the processor. If the frequency range is scanned in a ramp manner, such as shown in FIG. 2B, then each sensor emits an output similar in form to that shown in FIG. 2C. A change in the peak voltage of a sensor from one time interval to the next indicates a change in the ambient magnetic field at the location of that sensor. The repetitive time intervals are designed to repeat often enough so that the fast opening and closing of a door will not escape detection. In the two time intervals shown in FIG. 2C, it is seen that the amplitude of the output voltage of sensor A is the same each time and similarly for sensor B, but that in the case of sensor C, the amplitude has changed indicating a change in the ambient magnetic field at the location of that sensor. The signal measuring logic of the processor may include a high limit detector and a low limit detector for detecting the change in amplitude of a reply pulse to the processor from a magnetometer.

The embodiments of the invention in which an exclusive property or right is claimed are defined as follows:

1. Intruder detection and supervision means which has a plurality of magnetic sensors being interrogated by and reporting to a processor, comprising:
   a plurality of magnetometer means remote from said processor each having an input circuit for driving said magnetometer means and having an output circuit providing an output signal;
   a plurality of frequency selective means connected in the input circuits, respectively, of said plurality of magnetometer means, each of said frequency selective means being adjusted to a specific band of frequencies which is different from the others, said frequency selective means allowing only said specific band of frequencies to energize said magnetometer means connected thereto,
   programmable multifrequency oscillator means in said processor, said oscillator means having a programmed frequency output during repetitive time intervals, said oscillator means transmitting in each of said specific bands of frequencies during each time interval according to said program;
   a first conductor connecting the output of said oscillator means to the input circuits of said plurality of magnetometer means so that each of said magnetometer means is thereby energized and provides an output signal during each time interval;
   a second conductor connecting the output circuit of each of said magnetometer means in a common line to said processor; and
   signal measuring means in said processor for receiving a reference signal from said oscillator means and receiving the output signals from said magnetometer means; said signal measuring means being responsive to a change in magnitude of said output signals from one time interval to the next to provide an indication thereof.

2. The invention according to claim 1 wherein said magnetometer means comprise an anisotropic thin film permalloy plated sensor.

3. The invention according to claim 2 wherein said anistropic thin film sensor comprises a plated wire, the plated wire being wound in a coil with another wire coil wound around said plated wire coil, said plated wire being connected to said input circuit and said another wire coil being connected to said output circuit.

4. The invention according to claim 1 wherein said frequency selective means comprises a series resonant inductance-capacity tuned circuit connected in series with said input circuit.

5. The invention according to claim 1 wherein said multifrequency oscillator means is a sweep frequency oscillator.

6. The invention according to claim 1 wherein said multifrequency oscillator means is a stepping frequency oscillator.

7. The invention according to claim 1 and further including means operable from said processor for resetting the magnetic state of said plurality of magnetometer means comprising switch means connecting a suitable source of voltage to the input circuit of each of said magnetometer means by way of a conductor and a diode.

* * * * *